Nov. 19, 1963 H. ZIMMERMANN ET AL 3,111,323

RECORD PLAYER WITH AUTOMATIC CUT-OUT DEVICE

Filed April 13, 1960 2 Sheets-Sheet 1

INVENTORS

Heinrich Zimmermann

Hans Hermann

RECORD PLAYER WITH AUTOMATIC CUT-OUT DEVICE

Filed April 13, 1960

2 Sheets-Sheet 2

INVENTORS
Heinrich Zimmermann
Hans Hermann

United States Patent Office 3,111,323
Patented Nov. 19, 1963

3,111,323

RECORD PLAYER WITH AUTOMATIC CUT-OUT DEVICE

Heinrich Zimmermann and Hans Hermann, St. Georgen, Black Forest, Germany, assignors to Oskar Steidinger and Siegfried Steidinger, trading as the firm Gebrueder Steidinger, St. Georgen, Black Forest, Germany Filed Apr. 13, 1960, Ser. No. 21,982
Claims priority, application Germany Apr. 22, 1959
10 Claims. (Cl. 274—9)

The invention concerns a record player having an automatic cut-out device.

For placing the pick-up manually on any point of the record, or avoiding damage to the pick-up or to the record and for accurately determining the exact point of starting, it is of substantial advantage for the record to be at a standstill.

There are in fact record players which permit the pick-up to be placed on the stationary record. The operation of such apparatus however is cumbersome and the starting time of the turntable so long that the sound reproduction is noticeably distorted to begin with.

By means of the invention the operation is simplified to such an extent that from the automatic cut-out of the apparatus to the restarting only one manual operation is required apart from placing the pick-up on the record.

According to the invention there is provided a record player having a pick-up adapted to be connected outside its swivelling range beyond the record with a switch element, which for the duration of the coupling keeps the motor circuit open, a disengageable gear member between motor shaft and the edge of the turntable which is adapted to be brought into its effective position by connection with an operating element and retained engaged in this position by means of a locking member adapted to be coupled with the switch element in such a manner that it cancels its locking effect on the said gear member when the pick-up is coupled with the switch element.

In connection with record players having a driving gear for controlling the changing of records and/or pick-up movement it is proposed, in development of the invention, to permit the disengageable gear member to be alternately engageable by means of two operating members, one of the two operating members serving to connect the driving gear to the motor.

By means of such an arrangement, when starting such an apparatus having automatic pick-up movement, despite the separately controllable disengageable gear member, two manual operations are obviated.

A particularly expedient and simple arrangement in connection with an apparatus having a driving gear for controlling the record change and/or pick-up movement consists in the fact that the resilient means or working resistances against which the operating element for starting the record player is adjustable, are so constructed as to offer a stepped increase in resistance to actuation on a second part of the actuating path relative to a first part and the disengageable gear member is adapted to be brought into engagement with the gearing adapted to be coupled with the motor only in the second part.

If the operator wishes to start playing the record at any point he has only need, in this case, to depress the necessary starting element, e.g. a push-button which is necessary in any case, lightly, in order to start up the turntable.

The invention will be described further, by way of example, with reference to the accompanying drawings, in which.

Figure 1:
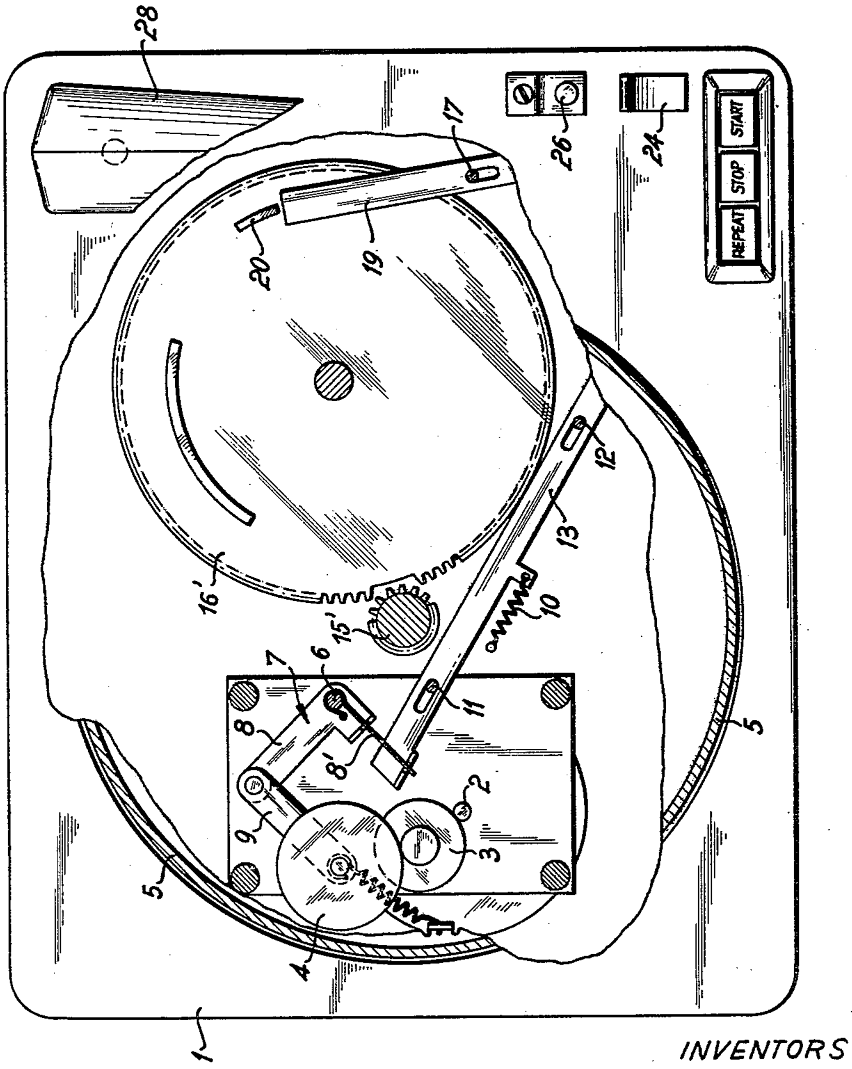
FIG. 1 is a plan view of a record player embodying the invention with the base plate broken away.
Figures 2, 3:
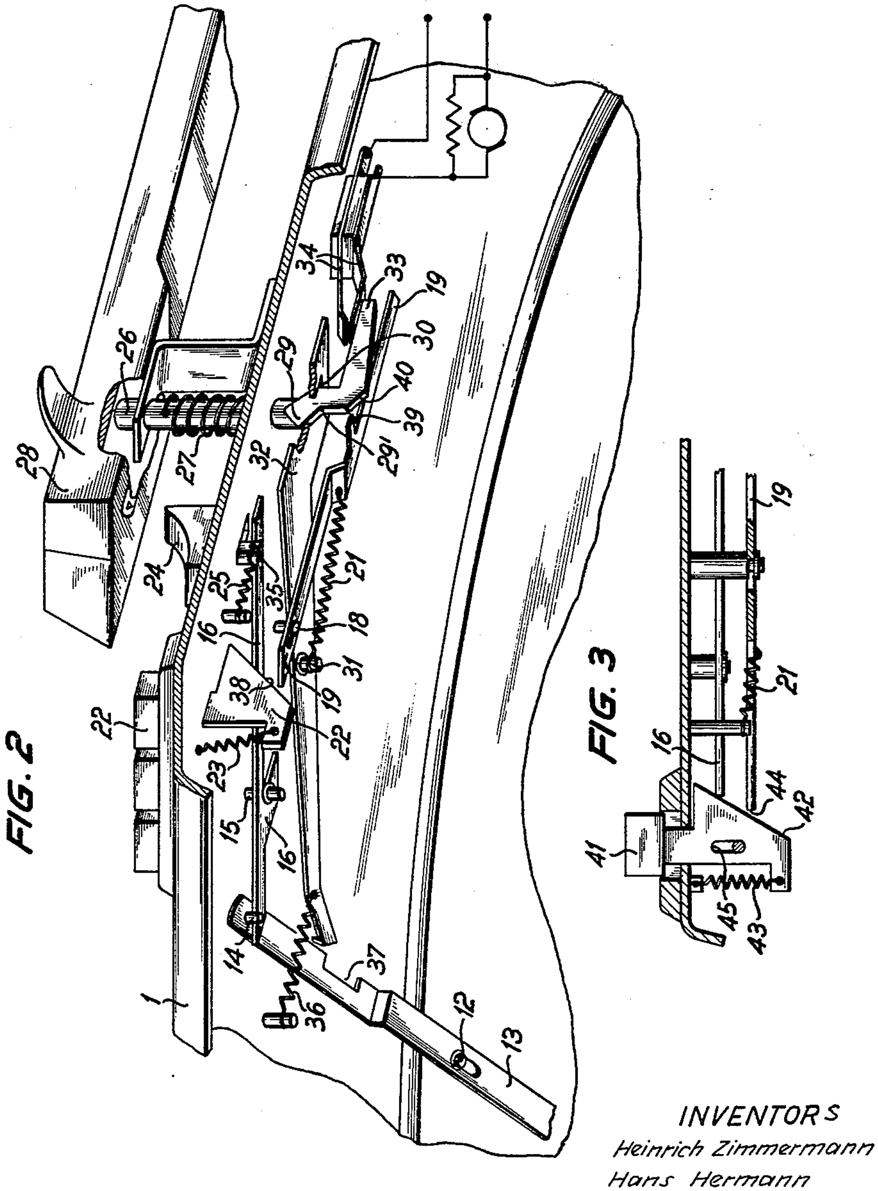
FIG. 2 is a part enlarged elevation of the record player of FIG. 1 from below.
FIG. 3 is a part enlarged section through the base plate of a record player adapted for carrying out a record change, also embodying the invention, in the region of the operating elements.

Referring to FIGS. 1 and 2, a driving motor which by means of its shaft 2 via a change gear 3 and an intermediate gear 4 drives a turntable 5, is mounted on a base plate 1. A bell crank 7 is mounted so as to pivot about a fixed pin 6. The shank 8 of the bell crank 7 is journalled, with a link 9 which guides the intermediate gear 4, pivotally in a horizontal plane. A bar 13 displaceably mounted on two fixed bolts 11 and 12 is pulled by means of a spring 10 in the direction towards the intermediate gear 4, and is connected at one end with a resilient shank 8′ to the bell crank 7. The bar 13 is connected at the other end, by means of a stop pin 14, FIGURE 2, with a lever 16 mounted for pivotal movement about a fixed bolt 15.

The turntable shaft carries a pinion 15′ which is adapted to be connected with a gear wheel 16′ for driving the pick-up movement and record change. A bar or slide 19 displaceably mounted on two bolts 17 and 18, FIGURES 1 and 2, respectively, has one end disposed in the path of a projection 20 of the gear wheel 16′ and is urged into longitudinal translation away from the projection 20, by means of a spring 21. A push-button 22 is mounted for vertical displacement against the action of a spring 23 and has a cam edge 38 to engage and displace bar 19. A sliding button 24 is mounted for displacement against the action of a spring 25 in the base plate 1 and is provided with a projection or shoulder 35 to engage and pivot lever 16.

A pick-up rest 26 is movable downwardly against the action of a spring 27 and due to the weight of the pick-up 28 is forced into its lowermost position. The lower section 29 of the rest 26 engages in an aperture 30 of a lever 32 mounted for pivoting about a fixed bolt 31.

If the pick-up 28 is removed by hand from the rest 26 then the latter moves upwardly due to the action of the spring 27 so that its lower end 33 presses together the switch contacts 34 which close the motor circuit. The turntable drive is in the disengaged position shown in FIG. 1. The pick-up may be placed on the stationary record. By actuating the sliding button 24 in the direction towards the pick-up support shoulder 35 thereof engages and swings lever 16, which translates the bar 13 by means of the stop pin 14 against the action of the spring 10. This translation of bar 13 acts through resilient shank 8′ to pivot bell crank 7 counterclockwise, as the parts are viewed upon FIGURE 1. Gear 4, journaled upon the end of link 9, while remaining in mesh with the change gear 3, also moves into mesh with the ring gear on turntable 5, to thereby drivingly connect the latter with motor shaft 2. As bar 13 thus moves into final position in response to actuation by lever 16, the offset end of lever 32 biased by the spring 36 engages in the recess 37 of the bar 13 and locks it in such position.

The pick-up entering the end groove of the record causes in known manner an automatic cut-out device, not shown, to be set into motion, which strikes the gear wheel 16′ against its projection 20. It is herewith caused to engage the pinion 15′ of the rotating turntable shaft and actuates a control mechanism, known per se and not shown, for the pick-up movement, which swings the pick-up 28 outwards and deposits it on the rest 26. Due to the influence of the weight of the pick-up the inclined surface 29′ of the rest 26 swings the lever 32 in a direction to withdraw its end from recess 37 of the bar 13, thus freeing bar 13 for movement under urge of spring 10. The bar 13 under action of the spring 10 thereby moves towards the intermediate gear 4 and causes it to be moved out of driving relation with turntable 5, by means of the bell crank 7 and the shank 8. Depressing the lower section 29 simultaneously causes the contacts 34 in the motor circuit to be opened again. The apparatus is hence again in the inoperative position.

If the pick-up is to be placed automatically at the start of the record, the actuation of the push-button 22 causes the lever 16 to be shifted by means of the inclined control edge 38 thereof, and causes the intermediate gear wheel 4 to be engaged in the above described manner. At the same time the control edge 38 displaces the bar 19, which in turn with its edge 39 engages beneath the inclined surface 40 of the rest 26, hence closing the motor circuit by means of the contacts 34. Furthermore the bar 19 engages the gear wheel 16′ via the projection 20 hence setting into motion the movement mechanism for the pick-up. Returning the pick-up 28 to its rest 26 and switching off the apparatus is effected in the manner previously described.

In the example according to FIG. 3 the push-button 22 is combined with the sliding button 24 to form a single push-button 41. The remaining mechanism corresponds to that shown in FIGS. 1 and 2. The position of the control edge 42 of button 41 is so selected that, when the push-button 41 is depressed, first the lever 16 is actuated against the comparatively small force of the springs 10 and 43. As edge 42 engages end 44 of the bar 19 the button 41 encounters a greater resistance due to a pre-tensioned spring 21. Thus, if the button is only lightly depressed it has the same effect as the sliding button 24. If however, it is depressed to its stop 45, it also displaces the slide 19, thus causing the functions of the push-button 22 to be brought about.

The control of the motor circuit and of the locking of the intermediate gear by means of the depositing movement of the pick-up may also be effected in such a manner that the last section of the horizontal swivel movement of the pick-up is utilized therefor.

When applying the invention to a record player without automatic pick-up control, the cut-out device can bring about the disengaging of the intermediate gear 4 directly (on lever 32), i.e. not via the pick-up control mechanism.

We claim:

1. In a record player of the turntable type having a tone arm and a turntable and having a drive means connected to said turntable, means urging said drive means into driving engagement with said turntable, resilient means urging said drive means out of said engagement, means operatively connected to said resilient means counteracting said resilient means and permitting driving of said turntable, and means interconnecting said tone arm and said operating means for restoring the operation of resilient means to disconnect said drive means from said turntable.

2. The record player of claim 1, said interconnecting means comprising a first lever pivotable to a position engaging and holding said resilient means in position permitting driving of said turntable, and spring means urging said first lever into its said position.

3. The record player of claim 2, said interconnecting means also comprising a vertically-movable tone arm rest, means urging said rest into an upper position, said rest being moved to a lower position, against the force of said urging means, by the weight of the tone arm thereon, there being cooperating cam surfaces between said tone arm rest and said first lever, said cam surfaces operating to pivot said first lever out of its said position to thereby release said resilient means and disconnect said drive means from said turntable, by and in response to movement of said tone arm rest from its said upper position to its said lower position.

4. The record player of claim 3, said drive means including an electric motor, and energizing circuit for said motor including a switch associated with said tone arm rest, movement of said rest into its said upper and lower positions effecting closure and opening of said switch, respectively.

5. The record player of claim 4, said switch being spring urged to normally open position, movement of said rest into its said upper position engaging and closing said switch.

6. The record player of claim 3, a second lever pivotable to engage and move said resilient means to position wherein said first lever may, under urge of said spring means, engage and releasably hold said resilient means to permit driving of said turntable, and a first button manually shiftable to engage and pivot said second lever.

7. The record player of claim 6, a bar longitudinally slidable, there being interengaging cam surfaces between said bar and said tone arm rest operable to positively move said tone arm rest upwardly from its said lower position, by and in response to sliding of said bar from a first to a second position, and a second button manually movable to slide said bar to its said second position and pivot said second lever.

8. The record player of claim 7, a record pick-up mechanism, a disconnectable drive between said turntable and pick-up mechanism, movement of said bar to elevate said tone arm rest also moving said pick-up mechanism to connect the same with said turntable.

9. In a record player of the turntable type having a tone arm and a turnable and having a drive means connected to said turntable, means urging said drive means into driving engagement with said turntable, resilient means urging said drive means out of said engagement, means operatively connected to said resilient means counteracting said resilient means and permitting driving of said turntable, means interconnecting said tone arm and said operating means for restoring the operation of said resilient means to disconnect said drive means from said turntable, said interconnecting means comprising a first lever pivotable to a position engaging and holding said resilient means in position permitting driving of said turntable, and a second lever pivotable to engage and move said resilient means to a position wherein said first-lever, under urge of said spring means, engages and releasably holds said resilient means to permit driving of said turntable, and a button manually shiftable to engage and pivot said second lever.

10. In a record player of the turntable type having a tone arm and a turntable and having a drive means connected to said turntable, means urging said drive means into driving engagement with said turntable and resilient means urging said drive means out of said engagement, means operatively connected to said resilient means counteracting said resilient means and permitting driving of said turntable, means interconnecting said tone arm and said operating means for restoring the operation of resilient means to disconnect said drive means from said turntable, said interconnecting means including a first lever pivotable to position engaging and holding said resilient means in position permitting driving of said turntable and spring means urging said first lever into its said position, said interengaging means also including a vertically-movable tone arm rest and means urging said tone arm rest into an upper position, said rest being moved to a lower position against the force of said urging means, by the weight of the tone arm thereon, there being cooperating cam surfaces between said tone arm rest and said first lever, said cam surfaces operating to pivot said first lever out of holding engagement with said resilient means, by and in response to movement of said tone arm rest to its said lower position, second lever pivotable to engage and move said resilient means to effect driving of said turntable, a bar slidable to engage and cam said tone arm rest upwardly from its lower position, a spring connection between said bar and said first lever, and a button shiftable to sequentially engage and shift said bar and pivot said second lever, in the order mentioned.

References Cited in the file of this patent

UNITED STATES PATENTS

| | | |
|---|---|---|
| 1,915,906 | Thomas | June 27, 1933 |
| 2,596,016 | Falk | May 6, 1952 |
| 2,654,457 | Ammlung et al. | Oct. 6, 1953 |
| 2,956,830 | Dennis | Oct. 19, 1960 |
| 2,977,124 | Staar | Mar. 28, 1961 |

FOREIGN PATENTS

| | | |
|---|---|---|
| 1,052,131 | Germany | Mar. 5, 1959 |